United States Patent
Steinbrecher

(10) Patent No.: US 12,155,447 B1
(45) Date of Patent: Nov. 26, 2024

(54) METHOD FOR DESIGNING A SEGMENTED APERTURE SIGNALS INTERCEPT SYSTEM BASED ON DETERMINING A DRIVING POINT IMPEDANCE

(71) Applicant: The United States of America as represented by the Secretary of the Navy, Newport, RI (US)

(72) Inventor: Donald H Steinbrecher, Brookline, MA (US)

(73) Assignee: The United States of America as represented by the Secretary of the Navy

( * ) Notice: Subject to any disclaimer, the term of this patent is extended or adjusted under 35 U.S.C. 154(b) by 370 days.

(21) Appl. No.: 17/890,305

(22) Filed: Aug. 18, 2022

(51) Int. Cl.
*H04B 17/336* (2015.01)
*H04B 7/08* (2006.01)

(52) U.S. Cl.
CPC ......... *H04B 7/0814* (2013.01); *H04B 17/336* (2015.01)

(58) Field of Classification Search
CPC ...... H04B 7/0814; H04B 17/336; H04B 7/02; H04B 7/028; H04B 7/0452; H04B 17/00; H04B 17/30; H04B 17/345; H04B 17/346; H04B 17/347
See application file for complete search history.

(56) References Cited

U.S. PATENT DOCUMENTS

| | | | | |
|---|---|---|---|---|
| 7,250,920 | B1* | 7/2007 | Steinbrecher | H01Q 17/00 343/893 |
| 8,538,358 | B1* | 9/2013 | Steinbrecher | H01Q 21/061 455/260 |
| 10,001,542 | B1* | 6/2018 | Steinbrecher | H01Q 3/2682 |
| 11,695,222 | B2* | 7/2023 | Mahanfar | H01Q 5/42 343/756 |
| 2005/0156802 | A1* | 7/2005 | Livingston | H01Q 13/10 343/770 |
| 2009/0315802 | A1* | 12/2009 | Johansen | H01P 1/047 343/893 |
| 2010/0026574 | A1* | 2/2010 | Pozgay | H01Q 3/36 342/371 |

\* cited by examiner

*Primary Examiner* — Angelica Perez
(74) *Attorney, Agent, or Firm* — James M. Kasischke; Michael P. Stanley; Jeffry C. Severson

(57) ABSTRACT

A method is provided for determining segmented partition capture area by using a minimum detectable signal and a maximum interfering signal calculated from a driving point impedance. A signal channel of an analog-to-digital converter is selected and then a signal channel of a low-noise amplifier is selected in order to reduce the noise for the system using the method. The maximum value of the analog-to-digital noise and the minimum value of the analog-to-digital converter input signal sinewave signal are determined. The signal channel is designed by the use of a channel noise figure, a channel full scale input signal and a channel input impedance. A maximum interfering signal is defined by the channel full scale signal to set a limit on the segmented partition capture area.

2 Claims, 5 Drawing Sheets

METHOD FOR DESIGNING A SEGMENTED APERTURE SIGNALS INTERCEPT SYSTEM BASED ON DETERMINING A DRIVING POINT IMPEDANCE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention relates to a method for calculating a driving point impedance to assist in designing a segmented aperture signals intercept system with a high dynamic range and bandwidth. The driving point impedance is an important design factor for minimizing noise in a signals acquisition system.

(2) Description of the Related Art

A typical analog-to-digital converter has a high noise figure that sets a limit on the small signal detection capability of a signal path. In order to improve the signal detection capability; a low-noise pre-amplifier is needed before analog-to-digital conversion to achieve an acceptable system noise-figure for each signal path. The addition of a low-noise amplifier reduces the signal dynamic range of the signal path by the gain of the amplifier.

In systems that digitize electromagnetic signals, the signal dynamic range of the analog-to-digital converter (ADC) sets a fundamental limit. Narrow band systems can incorporate automatic gain control (AGC) to prevent analog-to-digital overload. In wideband systems, automatic gain control is impractical because the minimum detectable signal and the capability of the system are limited.

An alternative is to segment the air interface or also known as a segmented air interface so that the smallest signals are captured with the maximum aperture while the small apertures created by the partition elements capture the largest signals. The White Nail Air Interface is such a solution. The White Nail Air Interface (WNAI) design is described and claimed in the several related patents of Dr. Donald Steinbrecher which are incorporated herein by reference.

In U.S. Pat. No. 6,466,167, an array of antenna partition elements is uniformly distributed across a plane surface with each partition element having a phase center. An observable signal that contains a low-frequency component and a high-frequency component is captured by each aperture formed by the partition elements. The high-frequency component is summed with the signal portion captured by each aperture formed by adjacent partition elements near a phase center to form a plurality of captured sum signals.

The sum signals are sent to a signal processer that processes the signals with the low frequency component of the observable signal, including an analog to digital conversion to remove the high frequency component of the observable signal; to normalize the effects of the signal transfer on the digital sum signals; to synchronously re-sample the digital sum signals; and to differentially time-reference each digital sum signal to a phase center of the corresponding partition element. The processed digital signals are combined into a composite signal.

In U.S. Pat. No. 7,250,920; an electromagnetic radiation interface system is provided for use with radio wave frequencies. In the patent, a surface is provided with a plurality of partition elements. A corresponding plurality of termination sections are provided so that each partition element terminates with a termination section. The termination section includes one or more termination packages for operating on received electromagnetic radiation and/or for producing desired reflections and transmissions.

U.S. Pat. No. 7,420,522 provides an electromagnetic radiation interface for use with radio wave frequencies. A surface is provided with a plurality of metallic conical partition elements. A corresponding plurality of termination sections are provided so that each partition element terminates with a termination section.

The termination section has an electrical resistance to capture the electromagnetic wave energy received by each bristle to prevent reflections from the surface of the interface. Each termination section includes an analog-to-digital converter for converting the energy from each bristle to a digital word. The bristles mount on a ground plane with a plurality of coaxial transmission lines extending through the ground plane for interconnecting the bristles to the termination sections.

U.S. Pat. No. 8,610,637 provides a transition from a free-space propagating electromagnetic energy field to a transverse electromagnetic-mode propagating energy field in a transmission line. Electrically-conductive pads are disposed on a substrate with the pads spaced apart. Each pad electrically couples to one of the elongate elements at a base.

Each of the transmission line baluns extends through the substrate with one end disposed between the exposed portions of two adjacent pads. Each balun includes two identical-width electrical conductors with each conductor electrically coupled to one of the exposed portions. The energy capture system provides a transition from a propagating wave to a 50 Ohm transmission line.

U.S. Pat. No. 8,342,860 provides an interface board connector and individual conductive partition element seats. Each partition element seat includes four spring fingers that extend into apertures in a dielectric base plate of the interface assembly. Two adjacent spring fingers form a connector in one of the apertures that couples to a trace on a balun board contact post to form an impedance-matched extension of the balanced transmission line.

Each spring finger includes three distinct sections. A ramp section allows the balun board to push apart the spring fingers and slide into place. The contact sections of two adjacent spring fingers form the electrical junction between the balanced transmission line traces on the balun board contact post and the section of balanced transmission line formed by the parallel spring sections of the adjacent spring fingers.

U.S. Pat. No. 8,538,358 provides an apparatus for digitally controlling the launch of high-power broadband radio frequency waves with high linearity for use with a software defined air-interface system. A wave launcher contains an Eplane array with a plurality of Epixel segmented elements configured with a master digital controller. The digital controller processes the signals that are launched as radio frequency waves and develops the digital images necessary for synthesizers to format the signals to be converted to analog. A plurality of digital-to-analog converters coupled with power amplifiers convert the digital signal to analog. The analog signal is then sent to the segmented elements to be transmitted as radio frequency waves.

U.S. Pat. No. 8,401,134 provides a method for the design of a wide-band high dynamic-range electromagnetic signal receiving system. The method provides for receiving analog signals and converting the analog signals to a digital replica that can be processed to recover separate high-fidelity replicas of each signal in the received plurality. The method also provides for increasing the signal dynamic range with a parallel architecture comprising "p" identical parallel analog-to-digital channels wherein the value is determined by the ratio of the largest amplitude signal to the minimum detectable signal.

Furthermore, "p" is the fundamental limit on the number of parallel channels necessary to linearly process a plurality of signals containing a largest signal and a minimum detectable signal. The effect of increasing "p" is enabling parallel processing of a dense input signal spectrum so that no signal appears large enough to overload an analog-to-digital converter.

U.S. Pat. No. 9,094,081 provides a method for improving the range of an electromagnetic signal receiving system in which an analog electromagnetic signal is received from a signal source. A digital observable signal generator and digital-to-analog convertor produce an analog observable signal while a digital dither signal generator and an analog dither signal. The electromagnetic signal, the observable signal and the dither signal continue to a power divider via an analog signal combiner. The divider provides identical signal paths wherein each signal path includes a signal frequency bandwidth of interest.

The signal path signals amplify onto an analog-to-digital converter (ADC). The ADC is operable for a Nyquist frequency bandwidth where the dither signal includes a pseudo-random electromagnetic signal with electromagnetic energy that falls outside the signal frequency bandwidth of interest but falls within the Nyquist frequency bandwidth. A processor processes signals from the signal paths to produce a digital image of the analog electromagnetic signal.

In the prior art of FIG. 1, a White Nail segmented aperture is illustrated in which four partition elements are shown. The aperture air interface is a matrix-orientated uniform array of square-segmented elements. The square partition elements are "w" units on each side. The spacing of the partition elements is "p" units in the horizontal and vertical direction. The extent of the array is application-driven and may be either square or rectangular. The transverse electromagnetic transmission lines capture the electromagnetic energy at ports labeled "$z_0$" between adjacent partition elements.

The White Nail Air Interface has numerous variations for applications in a variety of scenarios in which the electromagnetic spectrum is the primary focus and the principal objective is to create digital twins of spectrum swaths. However, the prior art does not fully address a critical design parameter, which is the driving point impedance of the radio frequency ports of the White Nail Air Interface.

SUMMARY OF THE INVENTION

It is therefore a primary object and a general purpose of the present invention to provide a method for calculating a driving point impedance for a White Nail Air Interface (WNAI) design architecture with the result of flexibility in the size of aperture segments of the WNAI.

The present invention creates an impedance match at the interface between the partition ports of the WNAI and the balun ports that create system signal paths formed by each balun feeding a low-noise amplifier followed by an analog-to-digital converter. This forms a signal path that begins with the WNAI air interface and terminates in a digital signal data stream.

The method of the present invention provides flexibility for sizing the aperture segments. Being able to design for a specific driving-point impedance significantly reduces the cost of building and testing WNAI systems because the alternative involves design by iterations based upon prior designs.

Also, determining the radio frequency port (RF) driving point impedance enables impedance matching the interface between the WNAI radio frequency ports and the input impedance of the mating signal paths. This is critical for wideband operation in the development of a digital twin of the incident wide-band electromagnetic signal set.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
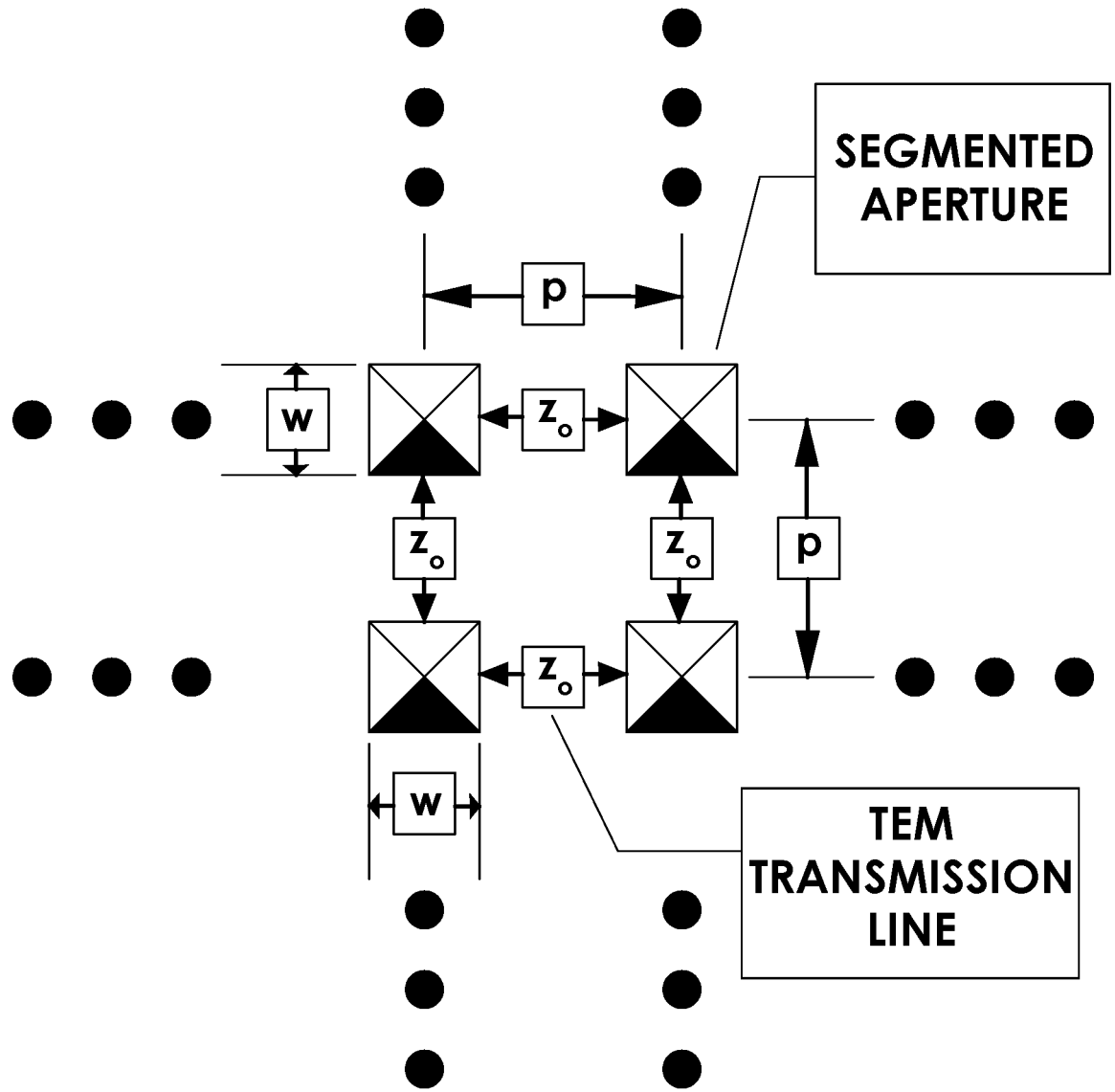
FIG. 1 depicts a prior art White Nail segmented air interface.

The White Nail Air Interface (WNAI) of the prior art FIG. 1 is a planar surface aperture having a capture area segmented into a plurality of apertures or equal capture area sub-apertures. The described patents of Steinbrecher provide the basis of the WNAI structure and are herein incorporated by reference.

In the Steinbrecher patents, an aperture is identified as an "E-plane" while each sub-aperture is identified as an "E-Pixel". An E-plane is segmented in order to increase the signal dynamic range of the software-defined electromagnetic system. Each E-pixel captures 1/n of the signal power which is then amplified and independently digitized; thereby, creating identical digital signal portions. For each of the captured signals, the digital signal portions combine in the digital domain to form a digital twin of the incident signal. The digital twins of the captured signals then combine to create a dynamic digital twin of the captured electromagnetic spectrum.

The signal dynamic range fundamental limit of the segmented aperture is N-times greater than the signal dynamic range fundamental limit achievable with a signal analog-to-digital converter. A White Nail Air Interface can also transmit digitally synthesized electromagnetic signals. The signal dynamic range arbitrarily approaches a signal-dynamicrange fundamental limit for a number of analog-to-digital converters incorporated in the design.

Two environmental parameters define the WNAI partition parameters. The minimum detectable signal (MDS) and the largest signal or full scale signal (FSS) which reaches "FULL SCALE" on the analog-to-digital in the signal path. The remaining parameters to be defined are the capture area of one partition E-pixel "CAL" and the capture area of the E-plane "CAN".

The CAL is proportional to the full scale signal and the CAN is proportional to the minimum detectable signal. The signal dynamic range fundamental limit of the WNAI system may be improved by a factor equal to the ratio CAN/CAL, which is why the aperture is segmented. Typical CAN/CAL ratios are on the order of one hundred which increases the signal dynamic range of a WNAI receiving system by approximately 20 dB.

One main advantage is ultra-wide bandwidth. For example, a typical WNAI instantaneous bandwidth may exceed five octaves, 32:1. This refers to the ratio of the highest frequency to the lowest frequency in a signal bandwidth. In this case, five octaves may be 1 Ghz to 32 GHz. Furthermore, the wide instantaneous bandwidth of a typical WNAI (with Maxwell's equations) predicts WNAI scalability across most of the useable electromagnetic spectrum.

Similarly, the WNAI scalability implies that air interface applications can utilize the most available space while maintaining wideband functionality. The scalability implies that the number of segments per unit area can adjust to accommodate the largest received signals during typical field operations.

A direct result of the variables affecting the optimum design parameters for WNAI segmented apertures is the need for flexible design modeling. The minimum detectable signal requirement determines the E-plane capture area while the maximum interfering signal requirement determines the E-pixel capture area and therefore the minimum number of aperture segments.

A typical WNAI rectangular E-plane with X-Y coordinates is a uniform array of W square-based partition elements arranged in N rows aligned with the X-axis and M columns aligned with the Y-axis such that W=M*N. A radio-frequency port is formed by facing parallel sides of each pair of segmented elements.

The radio-frequency (RF) ports created by faces aligned with the X-axis are identified as vertical radio frequency (VRF) ports and RF Ports created by faces aligned with the Y-axis are horizontal radio frequency (HRF) ports. Each radio-frequency port has a driving-point impedance, which is critical to the performance of the segmented array.

The driving point impedance is essentially the same for all radio-frequency ports. There are 2*(M+N)−4 edge radio frequency ports along the four sides of the E-plane array. The edge radio frequency ports may be terminated in the matching radio-frequency port driving point impedance to provide a smooth transition to the surrounding space. There are (M−2)*(N−1) VRF-ports and (M−1)*(N−2) HRF-ports.

Returning to FIG. 1, a White Nail segmented aperture is illustrated with four segmented elements. The transmission lines capture the electromagnetic energy ports labeled "$z_0$" between adjacent segment elements. The square segment elements are "w" units on each side. Electromagnetic energy capture takes place in the gaps between the partition elements by the radio frequency ports labeled '$Z_0$', which indicates that a transition occurs at each of these radio frequency ports.

The only critical design parameter of the White Nail air interface is the characteristic impedance, $Z_0$, of the TEM radio frequency ports that provide the electronic interface with the segmented aperture. The characteristic impedance, $Z_0$, is determined by the ratio of the scale parameters, 'p' and 'w'. The following equations define $Z_0$ as a function of the ratio, "r".

In almost all applications, the desired value for the characteristic impedance, $Z_0$, will be 50 Ohms or 100 Ohms. The relation linking the ratio, "r" with the characteristic impedance is given by Equation (1):

$$r = \frac{w}{p} \tag{1}$$

Because the characteristic impedance is proportional to a design ratio; scaling can be accomplished while maintaining the desired characteristic impedance. Equation (2) addresses the configuration in FIG. 1.

$$z_0 = \frac{476.7}{\sqrt{\epsilon_r}} \frac{(1-r)}{(1+2.58r)} \tag{2}$$

$$0.6 < r < 0.8$$

For $Z_0 = 50$ Ohms, $r = 0.7045$

For $Z_0 = 100$ Ohms, $r = 0.5127$

Figure 2:
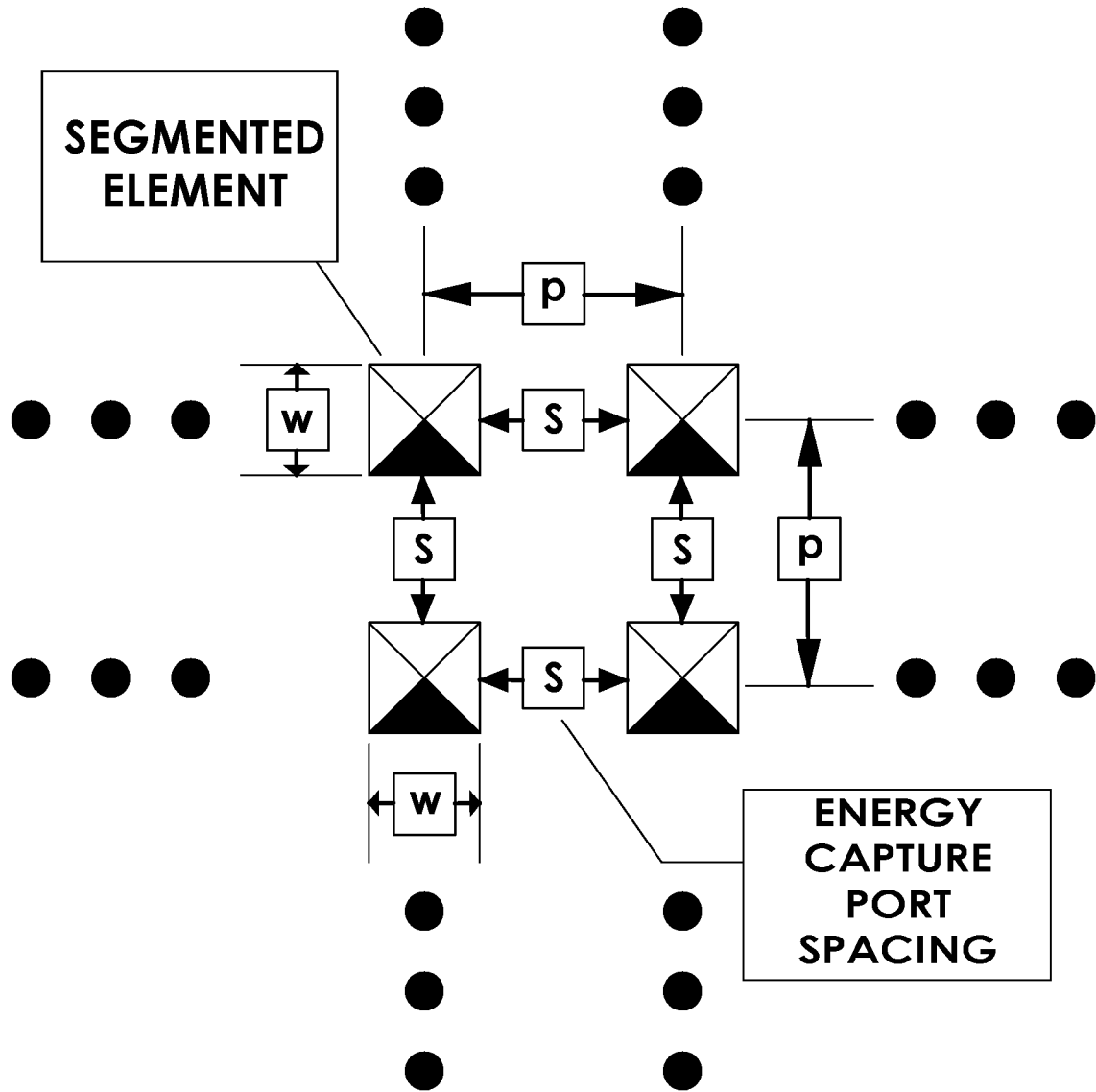
FIG. 2 depicts a prior art White Nail segmented air interface with three critical dimensions that define a planar design.

FIG. 2 illustrates the prior art planar arrangement of a White Nail segmented aperture. The three critical dimensions are "p", "s", and "w". The segmented element spacing in both orthogonal directions is 'p'. The base edges of the square elements is 'w'. The width of the spacing between the elements, which is where the energy capture ports are located, is 's'.

Many designs begin by specifying the segmented element separation, "s", because the transition to a TEM line transition to the energy path is formed by "w" and "s". Assuming that "s" is independently specified, the values for "p" and "w" may be determined by Equation (3) and Equation (4) which incorporate the ratio "r".

$$p = \frac{s}{(1-r)} \tag{3}$$

$$w = rp \tag{4}$$

One example, which is the design used for most testing, is based on a transition impedance of 50 Ohms for which r=0.7045 as indicated in Equation (3). For this design, the value of 'w' was chosen to be 0.7874", which resulted in p=1.113" and s=0.3303".

Figure 3:
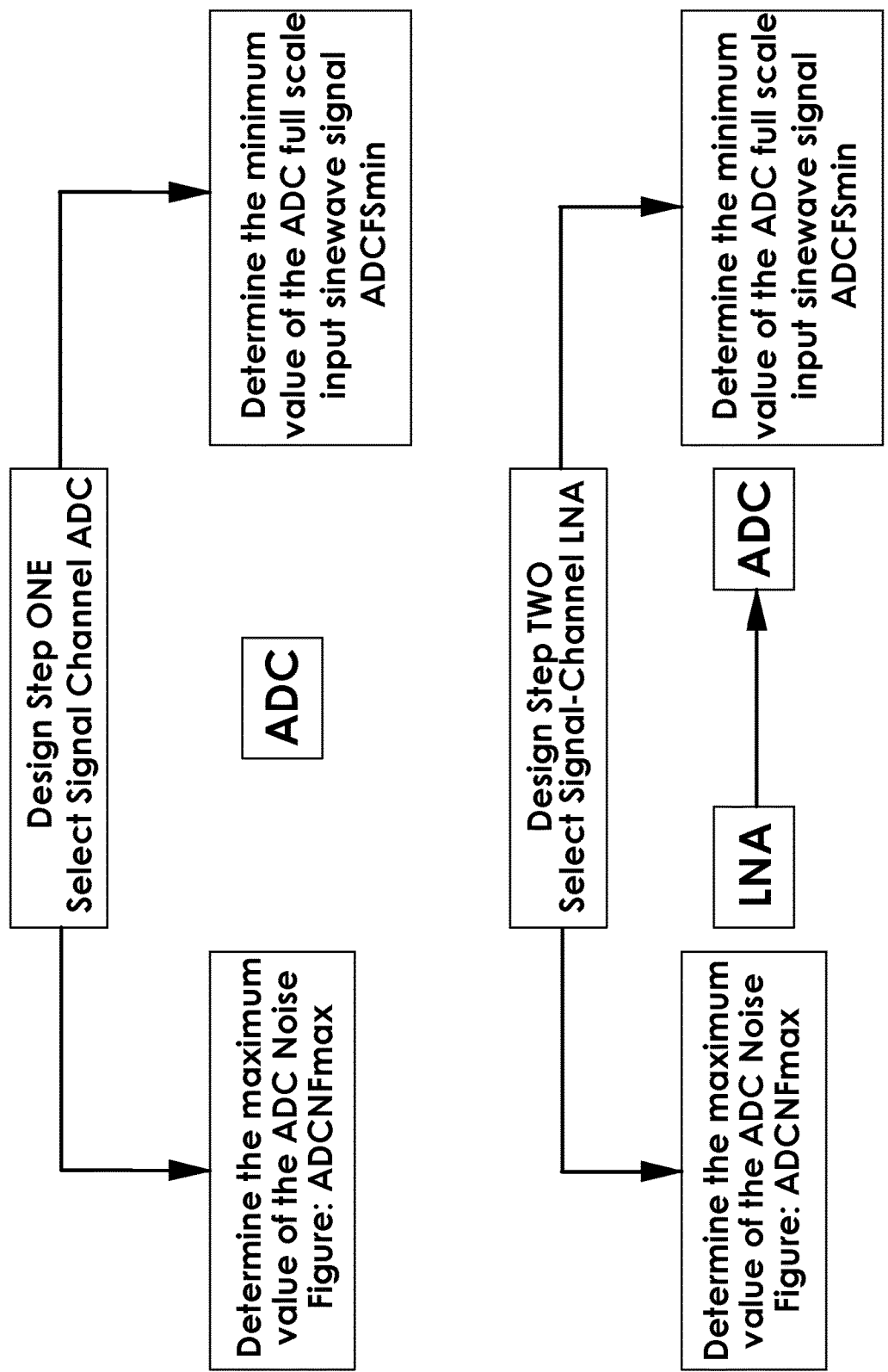
FIG. 3 is a block diagram of first and second steps of the method of the present invention.

FIG. 3 depicts design steps one and two. In design step one, a signal channel of the analog-to-digital converter is selected. The signal channels combine to create a digital twin of the incident electro-magnetic band captured by the WNAI.

The maximum value of the analog-to-digital noise figure (ADCNFmax) is determined by the manufacturer's specification, which similar to the manufacturer's specification of the low-noise amplifier noise figure. The analog-to-digital noise figure (ADCNF) is defined in terms of the signal-to-noise degradation as a conversion to digital takes place.

The minimum value of the analog-to-digital converter full-scale input signal (ADCFSmin) is also provided by the ADC manufacturer. The analog-to-digital converter full-scale minimum refers to the minimum peak signal amplitude that cannot be exceeded without causing the ADC to exceed a full-scale limit. If the input signal voltage exceeds the maximum allowed, the ADC only returns invalid outputs and may require significant time to recover.

A 'Noise Figure', F is defined as (input S/N-signal power/noise power)/(output S/N). A signal path comprises an LNA followed by an ADC with the LNA equals the noise figure of the LNA (low-noise amplifier). The GLNA equals the power gain of the LNA and FADC equals the noise figure of the ADC (analog-to-digital converter) and the (system noise figure) equals FLNA plus (FADC-1)/GLNA.

In design step two, a signal channel of a Low-Noise Amplifier (LNA) is selected by identifying enough gain in the signal channel to be greater than the noise. In a practical software-defined radio receiving systems design, an available ADC noise figure exceeds the minimum detectable signal specification for the radio. In this case, the LNA, is placed in the signal path before each ADC, in order to reduce the system noise figure to a level that meets the minimum detectable signal specification.

The maximum value of the analog-to-digital noise figure (ADCNFmax) is determined and the minimum value of the analog-to-digital converter input signal sinewave signal (ADCNFmin) is also determined.

Figure 4:
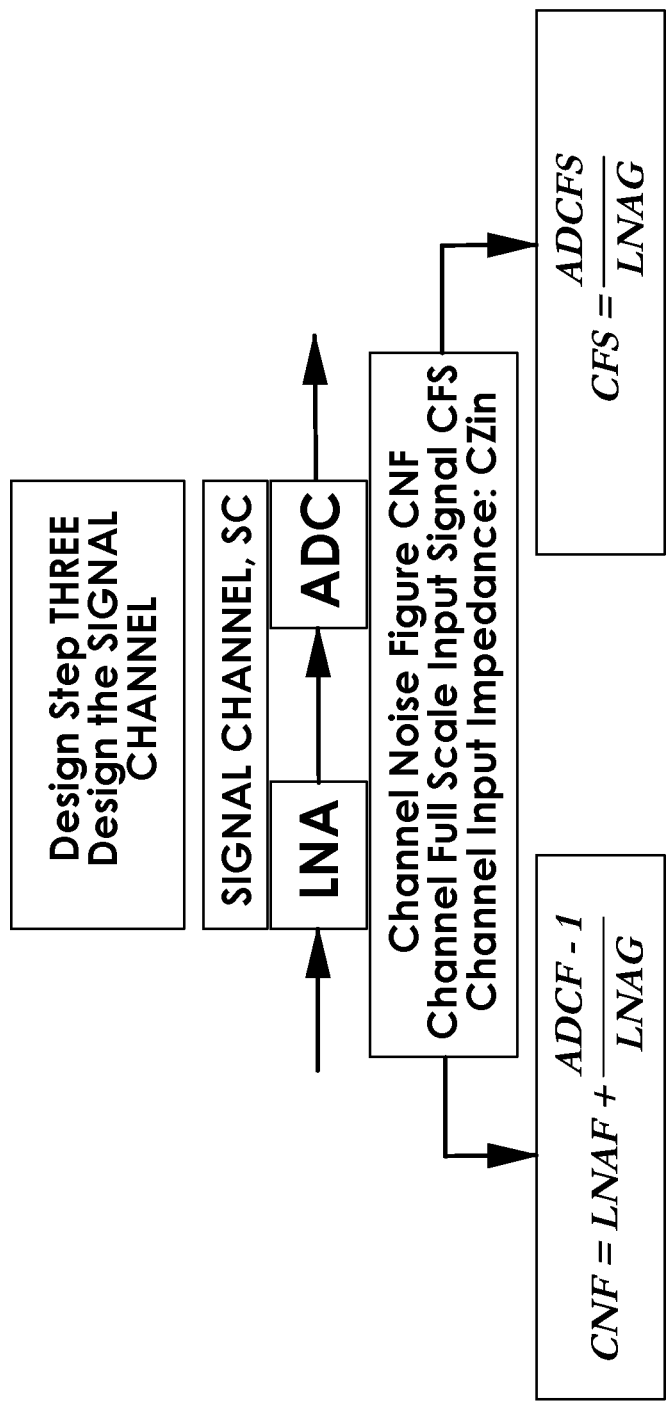
FIG. 4 is a block diagram of a third step of the method of the present invention.

FIG. 4 depicts design step three. In step three, the signal channel is designed by the use of a channel noise figure (CNF), a channel full scale input signal (CFS) and a channel input impedance (CZin). As known in the art, the channel noise figure can be determined by Equation (3) and the channel full scale input signal can be determined by Equation (4).

Figure 5:
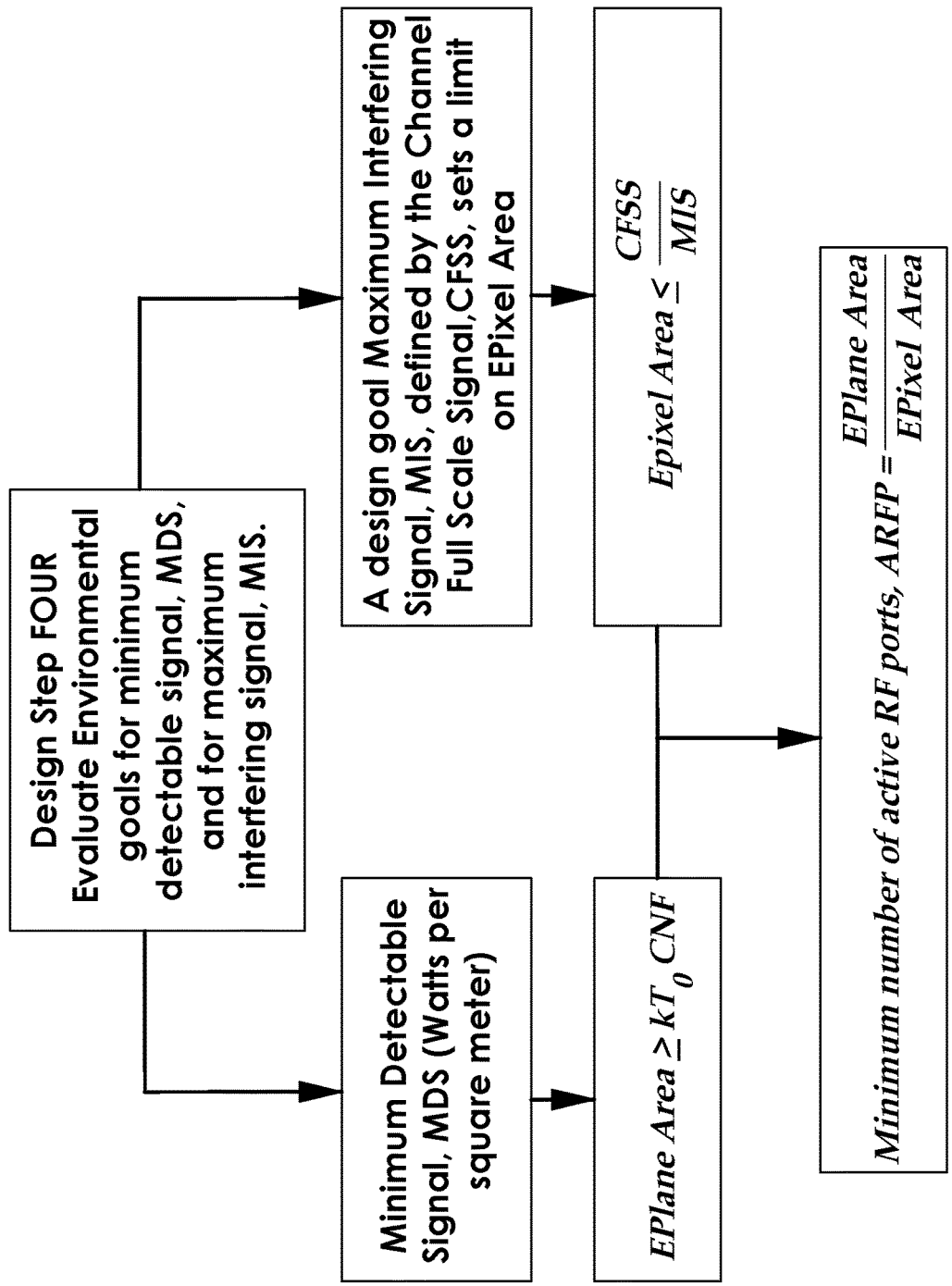
FIG. 5 is a block diagram of a fourth step of the method of the present invention.

FIG. 5 depicts design step four. In step four, the environmental goals for the minimum detectable signal (MDS) and for the maximum interfering signal (MIS) are evaluated. A design goal maximum interfering signal is defined by the channel full scale signal to set a limit on the Epixel area.

A Minimum Detectable Signal, MDS (Watts per square meter) is determined to set the Eplane area. Along with the limit of the Epixel area; the maximum number of active radio frequency ports is determined by adding up the active radio ports.

It will be understood that many additional changes in the details, materials, steps and arrangement of parts, which have been herein described and illustrated in order to explain the nature of the invention, may be made by those skilled in the art within the principle and scope of the expressed in the appended claims.

What is claimed is:

1. A method for determining a capture area for a plurality of radio-frequency ports associated with a segmented air interface, said method comprising the steps of:
identifying a first maximum value of an analog-to-digital noise figure as defined by signal-to-noise degradation during a an analog-to-digital conversion by an analog-to-digital converter;
identifying a first minimum value of a full scale input signal for the analog-to-digital converter as defined by a minimum peak signal amplitude that cannot be exceeded without causing the analog-to-digital converter to exceed a full-scale limit;
positioning an low-noise amplifier in a signal path preceding the analog-to-digital converter;
identifying a second maximum value of an analog-to-digital noise figure subsequent to said positioning the low-noise amplifier step with the second maximum value defined by signal-to-noise degradation during a conversion to digital;
identifying a second minimum value of a full scale input signal of the analog-to-digital converter subsequent to said positioning the low-noise amplifier step with the second minimum value defined by a minimum peak signal amplitude that cannot be exceeded without causing the analog-to-digital converter to exceed a full-scale limit;
determining a channel noise figure by $$p = \frac{s}{(1-r)}$$

where "p" is a spacing between partitioned capture elements of the segmented air interface and "s" is a width spacing between the partitioned capture elements which incorporates a ratio "r";
determining a channel full scale input signal by w=rp where "w" is a base edge of square elements for the radio frequency ports;
using the minimum detectable signal as a first partition parameter;
determining a full scale signal as a second partition parameter;
determining a capture area for at least one segmented partition of the segmented air interface based on said determining a minimum detectable signal as a first partition parameter set and said determining a full scale signal as a second partition parameter step; and
determining a capture area of a plane of the plurality of segmented partitions based on said determining a capture area of at least one segmented partition step.

2. The method in accordance with claim 1, said method further comprising the steps of:
evaluating environmental goals for the minimum detectable signal wherein the minimum detectable signal is greater than ambient environment noise;
evaluating environmental goals for the maximum interfering signal wherein the maximum interfering signal is defined by the channel full scale signal;
dividing the capture area of the plane of the plurality of segmented partitions by the capture area for the least one segmented partition of the segmented air interface; and
determining a capture area of a plane of the plurality of segmented partitions based on said determining a capture area of at least one segmented partition step.

* * * * *